Aug. 27, 1963     R. E. RICE     3,101,790
SCARIFIER BAR LOCK MECHANISM
Filed May 25, 1961     2 Sheets-Sheet 1

INVENTOR
Russell E. Rice
Paul O. Pippel
ATTORNEY

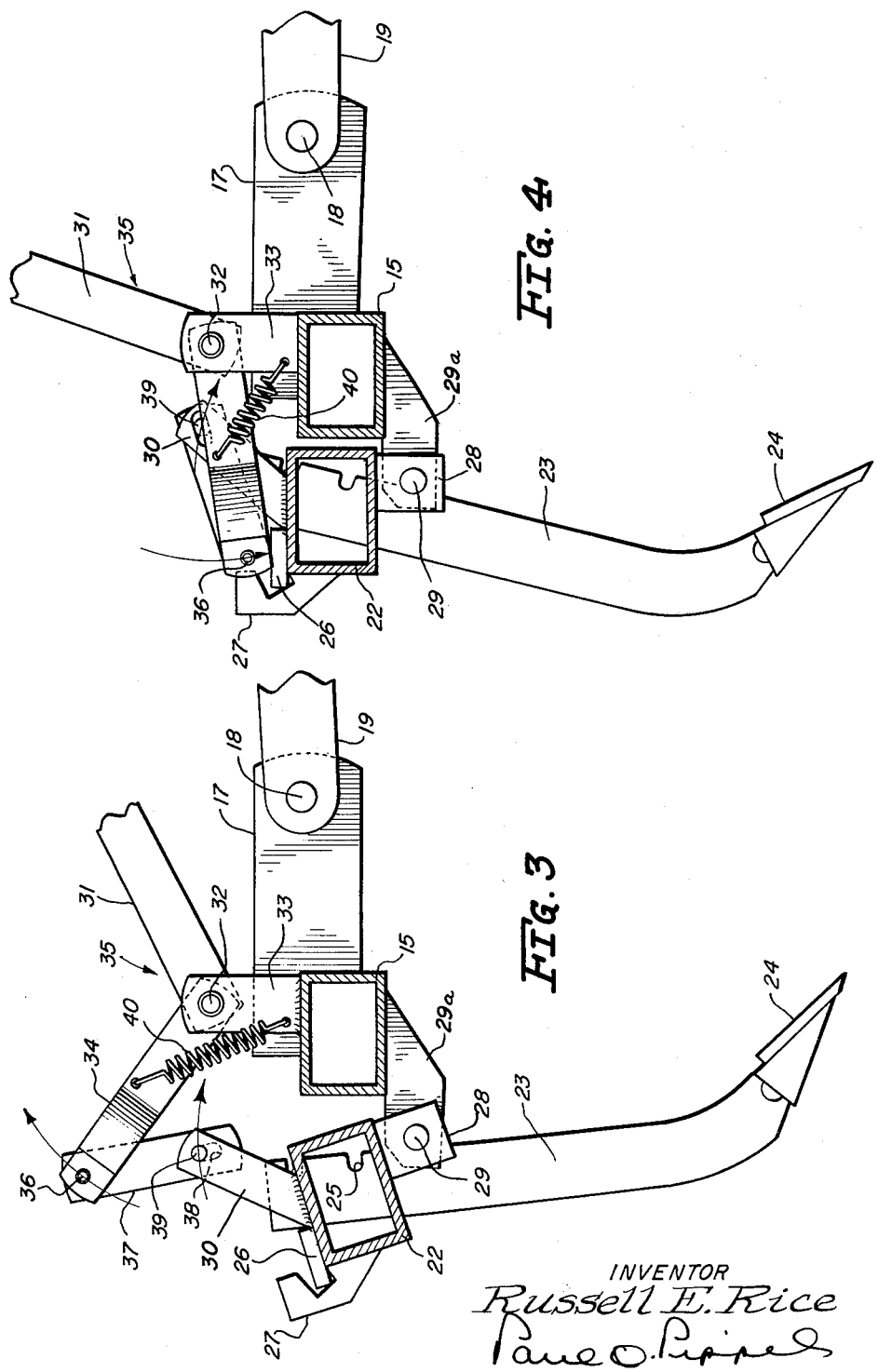

United States Patent Office 3,101,790
Patented Aug. 27, 1963

3,101,790
SCARIFIER BAR LOCK MECHANISM
Russell E. Rice, Stockton, Calif., assignor to International Harvester Company, Chicago, Ill., a corporation of New Jersey
Filed May 25, 1961, Ser. No. 112,720
9 Claims. (Cl. 172—317)

This invention relates to earthworking machines, and particularly to a combination earth scraper and scarifier.

An object of the invention is the provision of novel means for taking the scarifier elements out of operation when it is desired to use only the scraper blade, and returning them to and locking them in operating position.

Another object of the invention is the provision of improved means for mounting earthworking teeth on a supporting frame and for moving them from a non-operating position to, and automatically locking them in an operating position.

Another object of the invention is the provision of a scarifier attachment for an earth scraper wherein the scarifier teeth are mounted on an elongated tool bar pivoted on the supporting frame for swinging from a non-operating to an operating position, and wherein the momentum of the tool carrier as it is swung to its operating position is utilized to facilitate locking the tool carrier in place.

Other objects and advantages of the invention will become clear from the following detailed description when read in conjunction with the accompanying drawings, wherein:

FIGURE 3 is a sectional view similar to FIGURE 2 showing an intermediate position of the parts as the scarifier tooth carrier is swung toward its operating or closed position; and FIGURE 4 shows the operating or locked position of the teeth.

Figure 1:
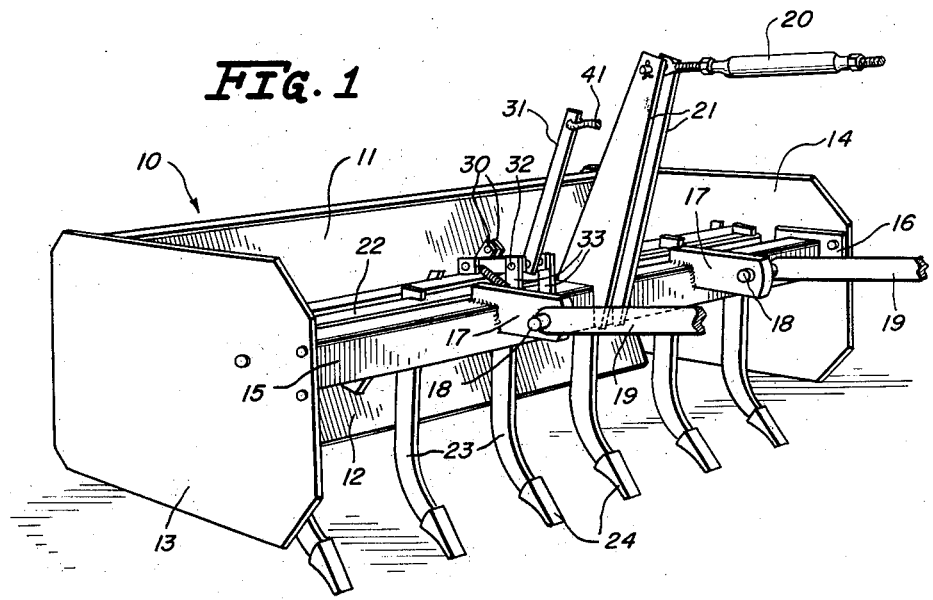
FIGURE 1 is a view in perspective of a combination earth scraper and scarifier embodying the features of this invention, adapted to be mounted upon a tractor to be carried thereby in transport.

In FIGURE 1 the numeral 10 designates the frame of the machine which includes a transverse back plate 11, to the lower end of which is secured an earth scraping blade 12, and forwardly extending side plates 13 and 14. Extending transversely between the forward ends of and bracing the side plates 13 and 14 is a frame member in the form of a rectangular beam 15 having flanges 16 at the ends thereof secured to the end plates 13 and 14.

Laterally spaced hitch bars 17 are affixed to, as by welding, and project forwardly from beam 15 and carry pivot pins 18 to which are connected the rear ends of the laterally spaced lower links 19 of a conventional three-point hitch, including an upper link 20 the rear end of which is pivotally connected to the upper ends of a pair of uprights 21, the lower ends of which are affixed to the frame member 15. The hitch links 19 and 20 are carried by a tractor, not shown, to which the implement is connected.

Frame member 15 constitutes the support for a tool carrier in the form of a transverse bar 22, rectangular in cross-section, having a plurality of laterally spaced apertures therein to slidably receive the upper ends of scarifier teeth 23, each of which is provided with an earth penetrating point 24.

Each of the shanks of the teeth 23 is flattened and the upper end of its forward edge is provided with one or more slots 25 adapted to engage the edge of the opening in which it is received, the teeth being held against displacement by the provision of a transversely extending lock bar 26, the rear edge of which is engaged by laterally spaced keepers 27 affixed to and extending upwardly from the rear face of the tool bar 22, the member 26 exercising a wedging action against the teeth.

A plurality of lugs or arms 28 are affixed to and depend from the forward lower face of the tool carrier 22, and each lug is connected by a pivot pin 29 with the rear end of a bracket 29a affixed to and extending rearwardly from the lower face of frame member 15.

The operating position of the teeth is shown in FIGURES 1 and 4, and in the latter figure, it is noted that the tool bar 22 is alongside and at the rear of member 15. Due to the fact that pivot 29 is offset from and forwardly of the center of gravity of the tool carrier 22 with the teeth 23 mounted thereon, the tool carrier is capable of swinging rearwardly and downwardly by gravity to the non-operating position shown in FIGURE 2 with the teeth elevated above the ground on a line generally horizontally below the frame member 15. This is the position the scarifier teeth occupy when the implement operator desires only to utilize the scraper 12.

The lug 28 forms a generally radial extension of the tool bar 22, and on the opposite or upper face of the bar 22 a generally radial projection in the form of an arm 30 extends at an angle upwardly and forwardly from the tool bar. In order to avoid the likelihood of the tool-carrying bar 22 accidentally swinging to an operating position, and in order to lift the teeth by swinging the tool carrier upwardly to the operating position thereof, combination power transmitting and locking means are provided including a lever 31 fulcrumed at 32 upon a lug 33 affixed to and extending upwardly from frame member 15, said lever 31 having a rearwardly extending arm 34 affixed to its lower end and forming therewith a bellcrank indicated at 35.

Lug 33 is one of a laterally spaced pair carrying a fulcrum or pivot pin 32 at their upper ends upon which the bellcrank 35 is mounted. Arm 34 is in the form of a yoke carrying at its rear end a pivot pin 36, upon which is pivotally mounted one end of a link 37, the other end of which is provided with a slot 38. A pivot pin 39 is received in slot 38 and is carried at the upper end of projection 30 which consists of a pair of spaced elements between which the end of link 37 is received.

Figure 2:
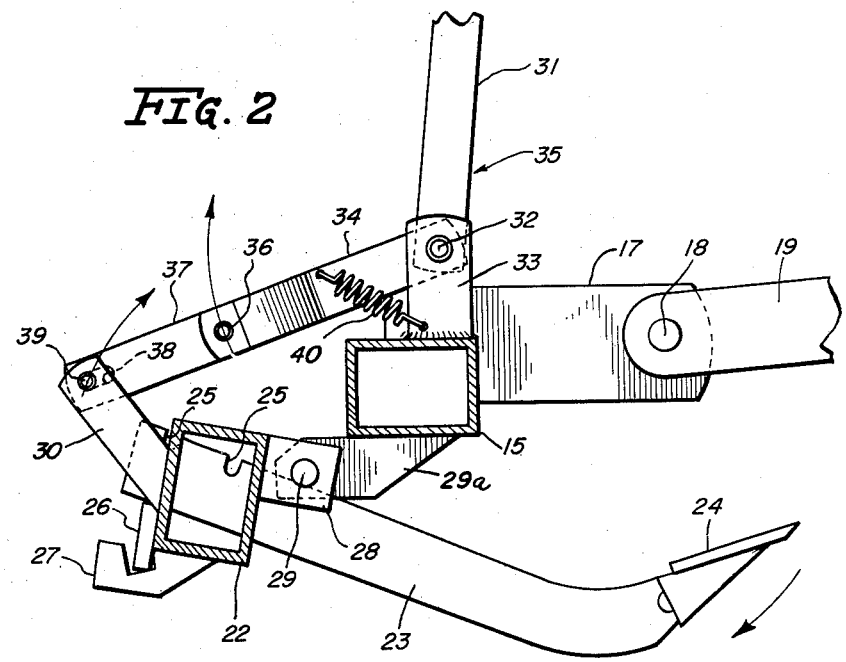
FIGURE 2 is an enlarged sectional detail, in side elevation, of a portion of the machine in FIGURE 1, showing the raising and lowering means for the scarifier teeth and illustrating the position occupied by the teeth in their non-operating position.

In the non-operating position of FIGURE 2, it will be noted that the axes of pivot pins 32, 36 and 39 are in substantial alignment and that link 37 is in alignment with arm 34 so that any tendency, during operation of the scraper or transport of the machine, for the tool carrier 22 to swing in a clockwise direction about the axis of pivot pin 29 is opposed. Bellcrank 35 is freely swingable about its fulcrum 32 but is biased counterclockwise in a direction to hold link 37 and arm 34 in line, by a coil spring 40, one end of which is anchored to lug 33, and the other to arm 34.

In raising the tool carrier to its operating position, the operator on the tractor by which the implement is propelled, pulls forwardly upon a cable 41 connected to the upper end of lever 31, to cause the tool carrier to swing about the pivot 29 upwardly. An intermediate position of the tool carrier relative to the tool frame is shown in FIGURE 3. When pivot 39 reaches a position between and in alignment with pivots 36 and 29, no further forward movement of lever 31 is possible.

By pulling vigorously upon the lever 31, the operator causes the tool carrier to swing clockwise under its own momentum and causing pivot 39 to move forwardly over center with respect to pivots 36 and 29.

As soon as pivot 39 is forwardly out of line with pivots 36 and 29, spring 40 causes the link means 37 to swing rearwardly about pivot 39 and pulls the yoke or arm 34 downwardly to the locked position shown in FIGURE 4. Inasmuch as pivot 39 is now between and over center with respect to pivot 36 and fulcrum 32, no movement of the tool carrier about the pivot 29 is possible, and the scarifier teeth are locked in their operating position.

The efficient movement of arm 34 and link means 37 to the locked position of FIGURE 4 is facilitated by the provision of the slot 38 in one end of the link means, allowing lost motion between the parts. Unlocking of the tool bar and return of the teeth to the non-operating position of FIGURE 2 is accomplished by another forward pull upon the lever 31, which has swung back from the position of FIGURE 3 to the locked position of FIGURE 4. The lever is pulled until the pivots 29, 36 and 39 are again in alignment, as in FIGURE 3, at which point gravity takes over and causes the tool carrier to swing downwardly to the non-operating position of FIGURE 2.

It is believed that the construction and operation of the novel scarifier lifting and locking apparatus of this invention will be clearly understood from the foregoing description. It should likewise be understood that the invention has been described in its preferred embodiment only, and that modifications may be made therein without departing from the spirit of the invention or the scope of the appended claims.

What is claimed is:

1. An earthworking machine having a transverse supporting frame, comprising a tool-carrying bar pivotally mounted on the frame for swinging about a transverse axis and having a plurality of laterally spaced scarifier teeth secured thereto for swinging therewith between an open non-operating position with the teeth extending generally horizontally below the frame and a closed or operating position with the teeth extending generally vertically, a lever having a fulcrum on the frame for forward and rearward swinging and having a generally horizontal arm secured thereto, a link having a pivotal connection at one end to said arm and at the other to the tool bar for transmitting the motion of said lever to the tool bar to swing the latter from said non-operating to said operating position, the pivotal connection of the link to the arm being on a center line between said fulcrum and the pivoted connection of the link to the tool bar in said non-operating position, said link being movable to a position with the pivotal connection thereof to the tool bar disposed between said fulcrum and the pivotal connection of said arm to said link and overcenter with respect thereto to lock the tool-carrying bar in its operating position.

2. The invention set forth in claim 1, wherein upon rocking said lever in a direction to swing the tool bar from its non-operating to its operating position, the pivotal connection of the tool bar to said link first moves overcenter with respect to the pivotal connection of the link to said arm and of the tool bar to the frame, and a spring connected between said arm and the frame urges the parts to their locked position.

3. The invention set forth in claim 1, wherein a radial extension is provided on said tool-carrying bar and connected to the frame on said transverse axis to accommodate swinging of the tool bar in an orbit about said axis.

4. The invention set forth in claim 3, wherein a radial arm is secured to said tool-carrying bar on the side thereof opposite said extension and is pivotally connected to one end of said link.

5. The invention set forth in claim 4, wherein the connection of one of said arms to said link includes lost motion facilitating movement of the tool-carrying bar to its locked position.

6. An earth-scraping machine having a transverse supporting frame member, comprising a tool-carrying bar having a plurality of laterally spaced scarifier teeth secured thereto, means pivotally mounting said tool bar on the frame member on a transverse axis spaced from the center of gravity of the tool bar to accommodate swinging thereof downwardly by gravity from an operating position with the teeth generally upright and alongside the frame member to a non-operating position with the teeth extending generally horizontally below the frame member, an upright lever having a fulcrum on the frame member for forward and rearward swinging, and connecting means between the lever and the tool-carrying bar for moving the latter from its non-operating position below the frame member to its operating position alongside the frame member, including a rearwardly extending arm affixed to the lever and swingable in a path upwardly upon forward rocking of the lever, a projection affixed to the tool bar, and a link pivotally connected at its ends to said arm and to said projection, the pivot of the link to said arm being between said fulcrum and the pivot of the link to said projection in said non-operating position of the tool-carrying bar, motion being transmitted through said link to swing the tool bar upwardly, and the momentum of the tool bar being sufficient to accommodate swinging of said link to a position with the pivot thereof on said projection disposed between the pivot thereof on said arm and said fulcrum and over center with respect thereto, whereby the tool-carrying bar is locked in its operating position.

7. The invention set forth in claim 6, wherein said lever and said arm constitute a bellcrank, and a spring operatively connected between said arm and said frame member resists the forward rocking of the bellcrank.

8. The invention set forth in claim 6, wherein lost motion is provided in one of the pivotal connections of said link to said arm and said projection to facilitate swinging of the link to said locked position.

9. The invention set forth in claim 6, wherein a pivot pin is carried at each end of said link and a slot is provided in one end of the link to receive one of said pins.

References Cited in the file of this patent
UNITED STATES PATENTS 2,839,851    Geiszler _____ June 24, 1958
2,865,117    Davis et al. _____ Dec. 23, 1958